(12) United States Patent
Wu et al.

(10) Patent No.: US 7,721,288 B2
(45) Date of Patent: May 18, 2010

(54) ORGANIZING TRANSMISSION OF REPOSITORY DATA

(75) Inventors: Yuh-Cherng Wu, San Jose, CA (US); Huiling Gong, Sunnyvale, CA (US)

(73) Assignee: SAP AG, Walldorf (DE)

( * ) Notice: Subject to any disclaimer, the term of this patent is extended or adjusted under 35 U.S.C. 154(b) by 1529 days.

(21) Appl. No.: 10/930,722

(22) Filed: Aug. 31, 2004

(65) Prior Publication Data

US 2006/0048155 A1 Mar. 2, 2006

(51) Int. Cl.
G06F 9/46 (2006.01)
G06F 15/16 (2006.01)
G06F 17/30 (2006.01)
G08C 15/00 (2006.01)

(52) U.S. Cl. .................... 718/101; 718/100; 718/105; 370/230; 370/235; 709/201; 709/217; 707/643; 707/705; 707/713; 707/736; 707/769; 707/781

(58) Field of Classification Search .................... 718/1, 718/100, 101, 102, 103, 104, 105, 106, 107, 718/108; 714/5, 15; 709/201, 202, 203, 709/217; 370/229, 230, 235, 232; 707/1, 707/2, 3, 8, 643, 673, 705, 706, 713, 711, 707/715, 736, 769, 770, 781, 812

See application file for complete search history.

(56) References Cited

U.S. PATENT DOCUMENTS

| 5,995,955 | A  | * | 11/1999 | Oatman et al. ............... 706/50 |
| 6,178,459 | B1 | * | 1/2001  | Sugiyama .................... 709/238 |
| 6,279,117 | B1 | * | 8/2001  | Takeda ......................... 714/5 |
| 6,353,844 | B1 |   | 3/2002  | Bitar et al. |
| 6,560,501 | B1 |   | 5/2003  | Walser et al. |
| 6,587,847 | B1 |   | 7/2003  | Stier et al. |
| 6,636,868 | B1 | * | 10/2003 | Bauer et al. ............... 707/104.1 |
| 6,805,502 | B2 | * | 10/2004 | Rai et al. ....................... 400/61 |

(Continued)

OTHER PUBLICATIONS

Rama Akkiraju, Pinar Keskinocak, Sesh Murthy and Frederick Wu; An Agent-Based Approach for Scheduling Multiple Machines; 2001 Kluwer Academic Publishers; Applied Intelligence 14, pp. 135-144.*

(Continued)

*Primary Examiner*—Meng-Ai An
*Assistant Examiner*—Abdullah Al Kawsar
(74) *Attorney, Agent, or Firm*—Mintz, Levin, Cohn, Ferris, Glovsky and Popeo P.C.

(57) ABSTRACT

A method of organizing a transmission of repository data includes receiving, in a computer system, a request to transmit data from a data repository to a data recipient. In response to the request, batch jobs for transmitting the data are performed. Each of the batch jobs identifies a data amount that is to be transmitted to the data recipient. Upon detecting during transmission that a performance parameter of the computer system does not meet a predefined standard, the data amount that is identified by at least one of the batch jobs is automatically changed. Changing the data amount may include splitting the batch job into at least two batch jobs, or merging the batch job with another batch job. A predictive model may be created for determining a control parameter that can be assigned to the batch jobs. The control parameter may help the system assume an optimal organization state.

62 Claims, 13 Drawing Sheets

U.S. PATENT DOCUMENTS

| | | | |
|---|---|---|---|
| 6,944,862 B2* | 9/2005 | Caggese et al. | 718/102 |
| 6,957,205 B1 | 10/2005 | Liongosari | |
| 7,020,876 B1 | 3/2006 | Deitz et al. | |
| 7,137,116 B2* | 11/2006 | Parkes et al. | 718/102 |
| 7,353,227 B2* | 4/2008 | Wu | 707/8 |
| 2002/0012332 A1* | 1/2002 | Tiedemann et al. | 370/335 |
| 2002/0124756 A1* | 9/2002 | Rai et al. | 101/484 |
| 2002/0147515 A1* | 10/2002 | Fava et al. | 700/95 |
| 2003/0007466 A1* | 1/2003 | Chen | 370/328 |
| 2003/0065648 A1* | 4/2003 | Driesch et al. | 707/2 |
| 2003/0149747 A1* | 8/2003 | Rai et al. | 709/219 |
| 2004/0030677 A1* | 2/2004 | Young-Lai | 707/2 |
| 2004/0083194 A1* | 4/2004 | Wu et al. | 706/45 |
| 2004/0193827 A1 | 9/2004 | Mogi et al. | |
| 2004/0208124 A1 | 10/2004 | Ogilvie | |
| 2004/0237087 A1* | 11/2004 | Ye et al. | 718/101 |
| 2005/0157756 A1 | 7/2005 | Ormond | |
| 2005/0192991 A1* | 9/2005 | Nomoto et al. | 707/101 |
| 2005/0198636 A1* | 9/2005 | Barsness et al. | 718/100 |
| 2005/0256826 A1* | 11/2005 | Hambrick et al. | 707/1 |
| 2007/0078117 A1 | 4/2007 | Hoffman et al. | |

OTHER PUBLICATIONS

Pablo Rodriguez; Dynamic Parallel Access to Replicated Content in the Internet; pp. 455-465; IEEE/ACM Transactions on Networking, vol. 10, No. 4, Aug. 2002..*

"Knowledge Repository for Software Agent Framework", by Yuh-Cherng Wu, dated Apr. 9, 2002, 35 pages.

"Compilation Service", Release 3.1 by Huiling Gong, undated, 14 pages.

"Compilation Service", Release 4.0, by Huling Gong, dated Dec. 16, 2002, 16 pages.

"BNALib, A Visual Basic Numerical Analysis Library for Personal Computers", downloaded from http://mathforum.org/library/view/3186.html on Aug. 3, 2004, 1 page.

"NMS-Numerical Analysis Library", downloaded from http://www.psu.edu/~burkardt/src/nms/nms.html on Aug. 3, 2004, 5 pages.

"Bulk Data Transfer Tools" by Tim Aldye, dated Apr. 2, 2001, 15 pages.

"The Authors Catalogue Their Documents for a Light Web Indexing" by Davide Musella, downloaded from http://www.isoc.org/inet96/proceedings/a2_4.htm on Mar. 29, 2004, 11 pages.

"Office WareHouse" advertising brochure, undated, 2 pages.

"Magnum eFILER™", downloaded from http://www.idt-inc.com/company_magnum_efilter.shtml on Apr. 21, 2004, 3 pages.

"Onbase Indexing Instructions", downloaded from http://www.fms.indiana.edu/ap/online_index.asp on Apr. 21, 2004, 5 pages.

"Advanced Database Indexing" by Yannis Manolopoulos, copyright 2000, Chapters 10-11, pp. 209-234.

"Selected Portions of File History of U.S. Appl. No. 10/930,697" retrieved from PAIR on Feb. 12, 2010.

* cited by examiner

ORGANIZING TRANSMISSION OF REPOSITORY DATA

TECHNICAL FIELD

This description relates to organizing a transmission of data from a repository.

BACKGROUND

Many computer systems use repositories for holding data that the system uses in its operations. In an enterprise resource planning system, the data may relate to the ongoing business operations performed in the system. Systems can have great volumes of data electronically stored in repositories, and this data can be updated at regular or arbitrary intervals.

In systems with great amounts of repository data, it becomes very important to provide adequate search functions for users to access the data. The system may include a search engine or equivalent providing search functionality for relevant documents according to a variety of criteria. A search engine typically has associated with it an index of repository contents. When a user enters a search query, the engine consults the index to determine whether there are any matches. In response, the search engine may send a "hit list" that enables the user to access any responsive data, for example in the form of a document. The process of creating the index based on the repository data is usually referred to as indexing.

When a new index is to be created, an initial indexing process is performed on the entire contents of one or more data repositories. In the case of a repository containing a large volume of data or from multiple distributed repositories, the indexing can take quite some time, up to a full day or more depending on system size. This may cause system resources to be unavailable or slow for a significant amount of time. Particularly, one bottleneck in this initial indexing process may be the step of transmitting the data from the repository to the service or equivalent that performs the indexing. It always takes a finite time to access one or more knowledge entities in the repository and to transmit the retrieved data to the indexing service. Moreover, the retrieval process may suffer from partially failed retrievals, for example when documents cannot be found where expected.

In existing systems, the transmission of repository data to a data recipient, such as an indexing service, may be performed in a sequential batch data retrieval process. Such a process is used in some products available from SAP AG in Walldorf (Baden), Germany. One disadvantage with this process is that it can be held up by a single batch of data that takes a long time to retrieve from the repository and/or to transmit to the indexing service. Such a delay means that it will occupy the system resource, and other indexes must wait longer until the index is finished, or in the case of an index being updated, that the content of the index will not be updated for a longer time. Moreover, such systems do not have a sophisticated solution for handling failed batch jobs efficiently.

If the indexing process takes a long time, this reduces system efficiency and delays the moment when the new index is ready to use. For this reason, indexing jobs that involve transmitting large amounts of data typically are run at times when system use is low, such as overnight or on weekends. In contrast, the process of later updating the index with changes in the repository data may take relatively less time, because it may be possible to focus the update indexing on only the knowledge entities that have changed since the index was created, a so-called delta update. Nevertheless, also this process can impact system performance if it involves a great volume of repository data, and the index content typically is not updated for search.

SUMMARY

The invention relates to organizing transmission of repository data.

In a first general aspect, a method comprises receiving, in a computer system, a request to transmit data from a data repository to a data recipient. In response to the request, batch jobs for transmitting the data are performed. Each of the batch jobs identifies a data amount that is to be transmitted to the data recipient. Upon detecting during transmission that a performance parameter of the computer system does not meet a predefined standard, the data amount that is identified by at least one of the batch jobs is automatically changed.

In selected embodiments, automatically changing the data amount that is identified by at least one of the batch jobs comprises splitting the batch job into at least two batch jobs, or merging the batch job with another batch job.

In selected embodiments, a recovery procedure is performed upon detecting that at least one of the batch jobs fails.

In selected embodiments, there is created a predictive model for determining a control parameter that can be assigned to the batch jobs. Assigning the control parameter may help the system more quickly assume an optimal organization state. When several predictive models have been created and there is to be transmitted a new job upon which none of the models is based, a sample portion of the new job may be transmitted and it may thereafter be determined which of the models is closest to an organization state assumed during transmission of the new job. There may be extracted from the model a variable that significantly contributes to determining the control parameter. The model may be updated based on monitoring one or more new data transmissions.

In a second general aspect, a method of organizing a transmission of repository data can be used in preparation for a future data transmission. The method comprises receiving, in a computer system, a request to transmit data from a data repository to a data recipient. Batch jobs for transmitting the data are performed in response to the request. Each of the batch jobs identifies a data amount that is to be transmitted to the data recipient. If a performance parameter of the computer system does not meet a predefined standard during transmission, the data amount identified by at least one of the batch jobs is automatically changed in preparation for a future data transmission.

In a third general aspect, a method of organizing a transmission of repository data comprises receiving, in a computer system, a request to transmit data from a data repository to a data recipient. A size of the data to be transmitted is determined, the size to be used in determining a number of batch jobs to be created for transmitting the data. Creating the number of batch jobs based on the size and initiating the batch jobs. Each of the batch jobs identifies a data amount that is to be transmitted to the data recipient. A performance parameter of the computer system is monitored while performing the batch jobs to determine whether the performance parameter does not meet a predefined standard. Upon detecting during transmission that the performance parameter does not meet the predefined standard, the method comprises evaluating whether a system resource tolerates creation of an additional batch job. If the system resource tolerates the creation the additional batch job is created, and if the system resource does not tolerate the creation at least two of the batch jobs are merged.

Advantages of the systems and techniques described herein may include any or all of the following. Providing improved organization of a transmission of repository data. Providing a transmission of repository data wherein the number of batch jobs being executed can be dynamically changed during the transmission. Providing a model-based prediction of an optimum organizational state for initiating the data transmission. Providing a selection algorithm for choosing between predictive models for a new transmission job. Providing extraction of a user-understandable variable that makes a significant contribution to a predictive model. Providing an efficient recovery procedure for batch jobs that fail during the data transmission.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
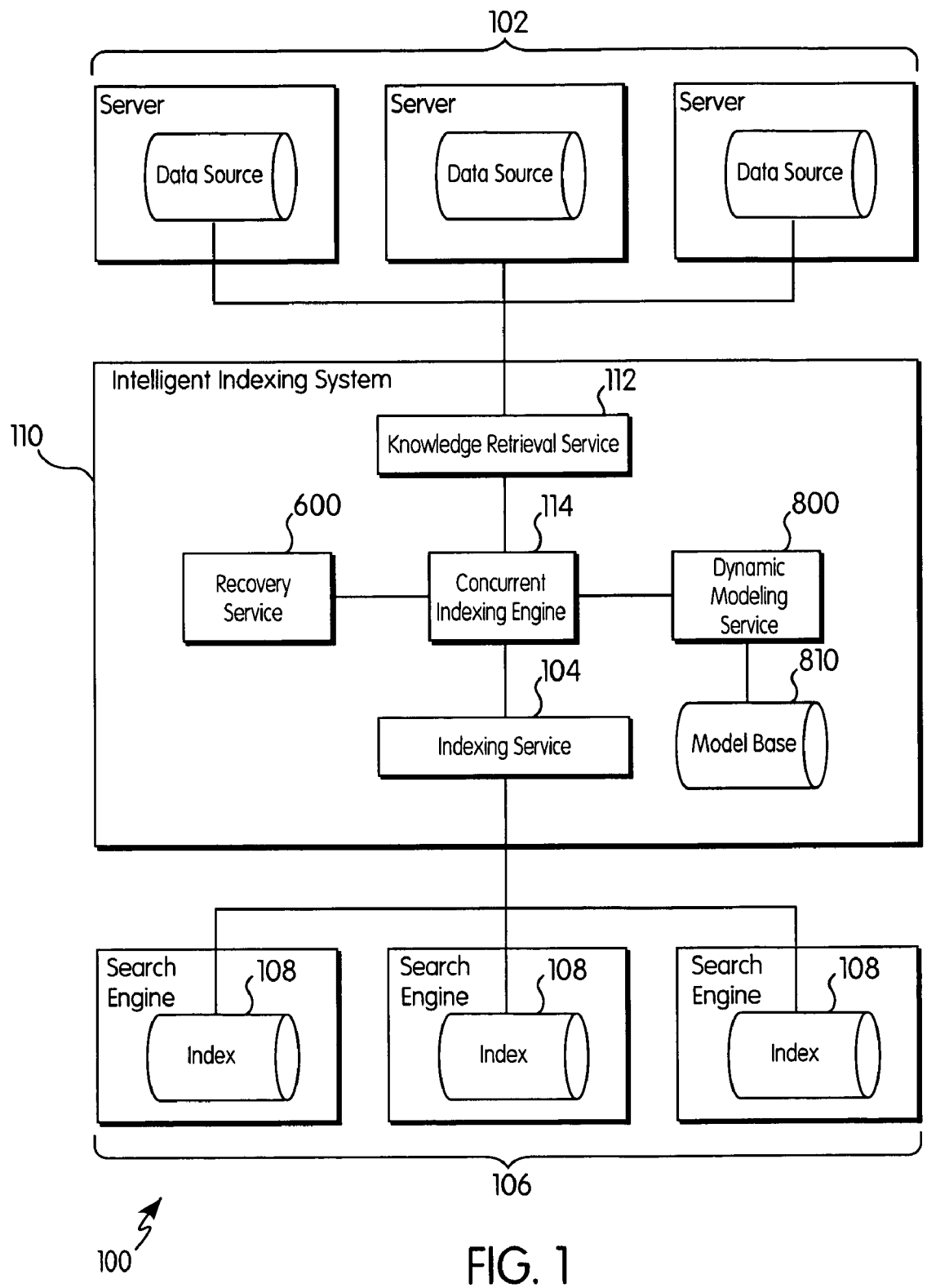
FIG. 1 is a block diagram of a system that organizes a transmission of repository data.

FIG. 1 is a block diagram of a system 100 that organizes a transmission of repository data from one or more data repositories 102 to a data recipient. Any or all of the data repositories may include a server device on which a data source is available. In this example, the data recipient is an indexing service 104 that will perform indexing for one or more search engines 106, each of which may have associated with it an index 108.

The data transmission may be initiated upon receiving a request from a user or from an automatically scheduled task. The indexing to be performed may be an initial indexing, meaning that the entire contents of one or more of the repositories 102 is being transferred. Another example is a periodic indexing wherein only the changed repository data is being transmitted. Yet another example is an automatic indexing when the original data are changed.

The indexing service 104 is here included in an intelligent indexing system 110 that communicates with the data repository 102 and the search engine 104. The intelligent indexing system 110 includes a knowledge retrieval service 112 that retrieves data from the repository 102. A concurrent indexing engine 114 creates batch jobs for transmitting the data, each of the batch jobs identifying a data amount that is to be transmitted to the recipient. When the concurrent indexing engine performs a batch job, it may trigger the knowledge retrieval service to retrieve the entire data amount that corresponds to the batch job. As another example, the concurrent indexing engine may successively trigger the knowledge retrieval service to retrieve portions of the batch job's data amount until the batch job is finished.

The data in the repository 102 may be of many different kinds. The data is embodied in at least one form, and this form is generally being referred to as a knowledge entity. Examples of knowledge entities include business transaction data, accounting records, business documents, sales orders, service orders, contact records, partner records or web pages. Other types of documents may be used. The transmission may involve knowledge entities that belong to a single or several different document types. Moreover, the same types of knowledge entities may be located in separate data repositories, such as when a multinational organization stores company records in several countries.

During transmission, the intelligent indexing system 110 monitors a performance parameter of the system 100. If the performance parameter does not meet a predefined standard during the transmission, the intelligent indexing system may automatically change the data amount that is identified by at least one of the batch jobs. More than one performance parameter may be monitored simultaneously. Also, different performance parameters may be monitored in different situations. Particularly, processing times per knowledge entity for the batch jobs, the amount of data processed per unit of time, an average processing time for the complete index cycle from retrieval to index update, a request-response time of another business application or combinations thereof, are examples of performance parameters.

Accordingly, if the intelligent indexing system finds that the batch job processing time, as one exemplary parameter, exceeds the predefined standard, it may change the data amount of one or more batch job in an attempt to bring the parameter to the predefined standard. This change may be made during the transmission or after the transmission. In the latter example, the change may be made in preparation for a future data transmission. When batch jobs are performed by successively retrieving portions of the batch job's data amount from the data repository, the performance parameter may be evaluated in association with retrieving each such portion.

A change in data amount may involve splitting a batch job into two or more batch jobs executed in parallel. Generally, the system may be able to process the data amount more quickly if it is distributed among more batch jobs. For example, with more batch jobs the system can initiate several retrievals essentially simultaneously from the data repositories 102, as opposed to processing them consecutively in a single batch job. On the other hand, creating additional batch jobs may increase memory use in the system 100 and, if memory availability is low, the additional memory use may decrease the system's overall performance. Accordingly, before performing a split operation the intelligent indexing system 110 may determine whether the system 100 tolerates an increased memory use. For a distributed-repository case, another restriction, such as availability or maximal allowed data connections between the server and the external data repository, may be considered.

As another example, a change in batch job data amount may involve merging a batch job with at least another batch job. Generally, merging batch jobs may free up system resources such as memory for other purposes. Also, with fewer batch jobs in progress the system may be able to perform more processing that is unrelated to the indexing, such as processing for an application program with which a user is working. Accordingly, when a performance parameter does not meet a predefined standard, the intelligent indexing system 110 may perform a merger operation upon detecting that the system does not tolerate an increased memory use.

Thus, the system 100 transmits the data to the indexing service 104 by performing the batch jobs, and the data amounts identified by the respective batch jobs can be changed during the transmission depending on the performance parameter. The indexing service parses through the received data and creates or updates the index 108. When the indexing is complete, the index is made available in the system so that the search engine(s) can perform searches on it.

Figure 2:
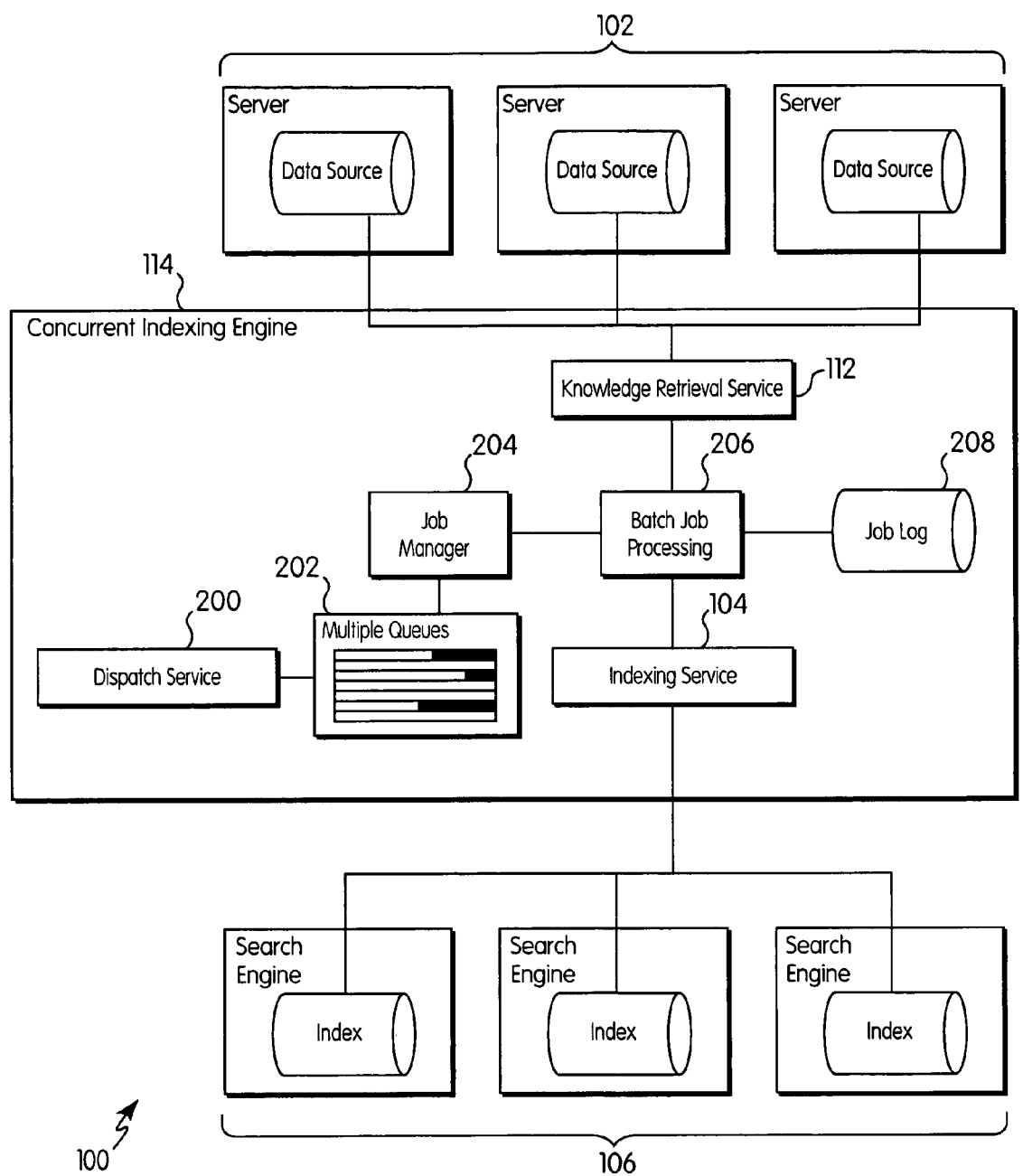
FIG. 2 is an example of components included in the system shown in FIG. 1.

FIG. 2 is a block diagram of components that can be included in the system 100, and particularly in the concurrent indexing engine 114. When the system receives a request to transmit data from the data repository 102 to the indexing service 104, the request is evaluated by a dispatch service 200 within the concurrent indexing engine. The dispatch service may determine a size of the data to be transmitted. This may be done by a programming call, for example by checking the size of a database table to determine how many knowledge entities are in the data load. The dispatch service creates a task for the requested transmission job and enters the task in one of multiple queues 202. The multiple queues may already contain one or more transmission job tasks. Particularly, the dispatch service may check whether the newly created task is dependent on a task that is already pending. For example, processing a clustering request before a delta update request, a fail-recovery request, or before deleting an index may not be efficient. Other examples of dependencies may involve having multiple same full-indexing requests or fail-recovery requests in the same queue. The dispatch service may automatically withdraw or rearrange requests based on a set of pre-defined business rules. Alternatively, the dispatch may provide a warning to a user and wait for the user's decision. The dispatch service can register a time stamp for the task. Such a time stamp can later be used in determining whether tasks are being promptly executed.

The multiple queues 202 provide parallel processing of transmission jobs. Each of the multiple queues may correspond to an index that is being updated or created. Different indexes can be created for different data repositories, such as for different servers in the data repositories 102. As another example, when a data repository includes knowledge entities of different languages, there may be created a separate index for each language. Thus, a transmission job may relate to more than one index.

A job manager 204 scans the multiple queues 202 and initiates tasks that are at the front of their respective queues. Upon selecting a task, the job manager creates a batch job for performing the associated transmission job. If the created batch job is to be divided into a number of batch subjobs, the job manager may assign the size of a data amount to be processed by each of the subjobs. Finally, the job manager initiates batch job processing 206 wherein the batch job(s) will be performed.

Figure 3:
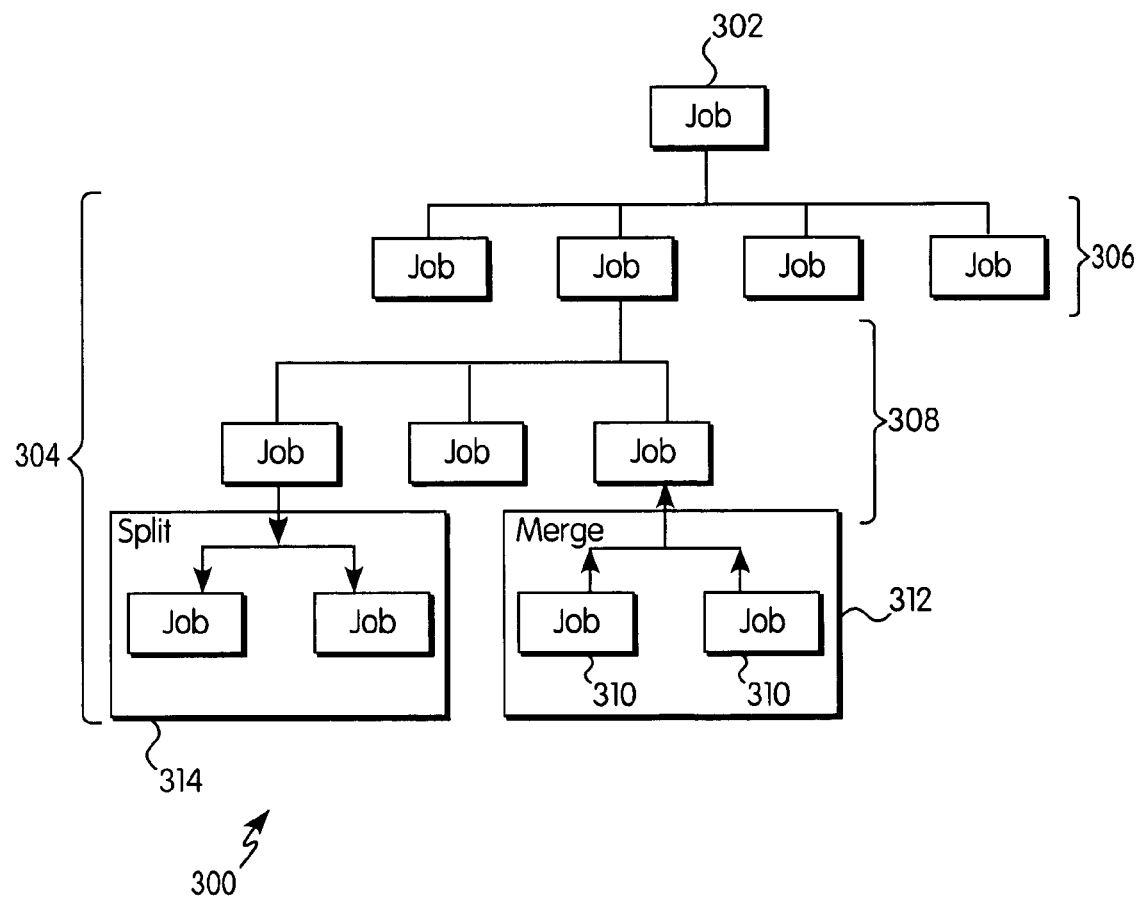
FIG. 3 schematically shows merging and splitting of batch jobs.

An example of the batch job processing 206 will be described with reference also to FIG. 3, which schematically shows batch jobs 300. The job manager 204 creates a first batch job 302 that corresponds to the entire transmission job and specifies that the first batch job should be split into four subjobs, here first batch subjobs 306. The splitting action changes the data amount directly handled by the first batch job by reducing it to zero. In contrast, each of the batch subjobs that are currently being performed identifies a portion of the first batch job's data amount. The system may log a time stamp upon initiating each of the first batch subjobs. Such a time stamp can be used in determining whether batch (sub)jobs are being promptly processed.

While processing the batch jobs, the system monitors a system performance parameter. If the parameter does not meet the predefined standard, the system changes the data amount identified by at least one of the first batch subjobs 306. For example, if the processing is less efficient than the predefined standard calls for, the system may seek to increase the number of batch jobs. Such an increase may be conditioned on determining that the system tolerates an increased memory use.

Here, the system splits one of the first subjobs 306 into three new subjobs. That is, the data amount identified by the one of the first subjobs 306 is divided among second batch subjobs 308. These subjobs will continue to be processed as are the remaining ones of the first batch subjobs 306. Accordingly, the system continues with retrieving the data identified by the subjobs from the data repository and changes the data amount identified by any of the batch jobs if the performance parameter does not meet the predefined standard.

The performance-parameter evaluation and the data-amount changing may be done at a parent-job level. That is, the system may compute performance measurements from the processing times of all subjobs that belong to a particular batch job. If the performance is not acceptable, the system may determine utilization of its resources, including parameters such as memory availability or processor load. If the system resource can tolerate more concurrent (sub)jobs, at least one new job may be created. If, on the other hand, no more jobs can be created, at least two of the (sub)jobs may be merged.

Here, the system splits one of the second batch subjobs 308 into third batch subjobs 310, and thereafter again determines that the performance parameter does not meet the predefined standard. Upon evaluating whether to change any data amount(s), the system can either perform a merge 312 of the third subjobs or a split 314 of another of the second batch subjobs. Which of these exemplary operations the system performs may depend on the availability of system resources such as memory.

The system may record events that occur during the transmission and that relate to the batch jobs. Such events can include the above described actions in the processing 206, including the detection of one or more instances where the performance parameter does not meet the predefined standard. Also, system status and performance measures may be recorded. For example, events can be recorded in a job log 208. The job log may be used when predicting organization states for batch jobs, as will be described. As another example, in implementations where the batch job data amounts are not changed during the transmission jobs, the job log may subsequently be used in changing the data amount of batch jobs in preparation for a future data transmission. Other examples of using the job log will be described later.

Figure 4:
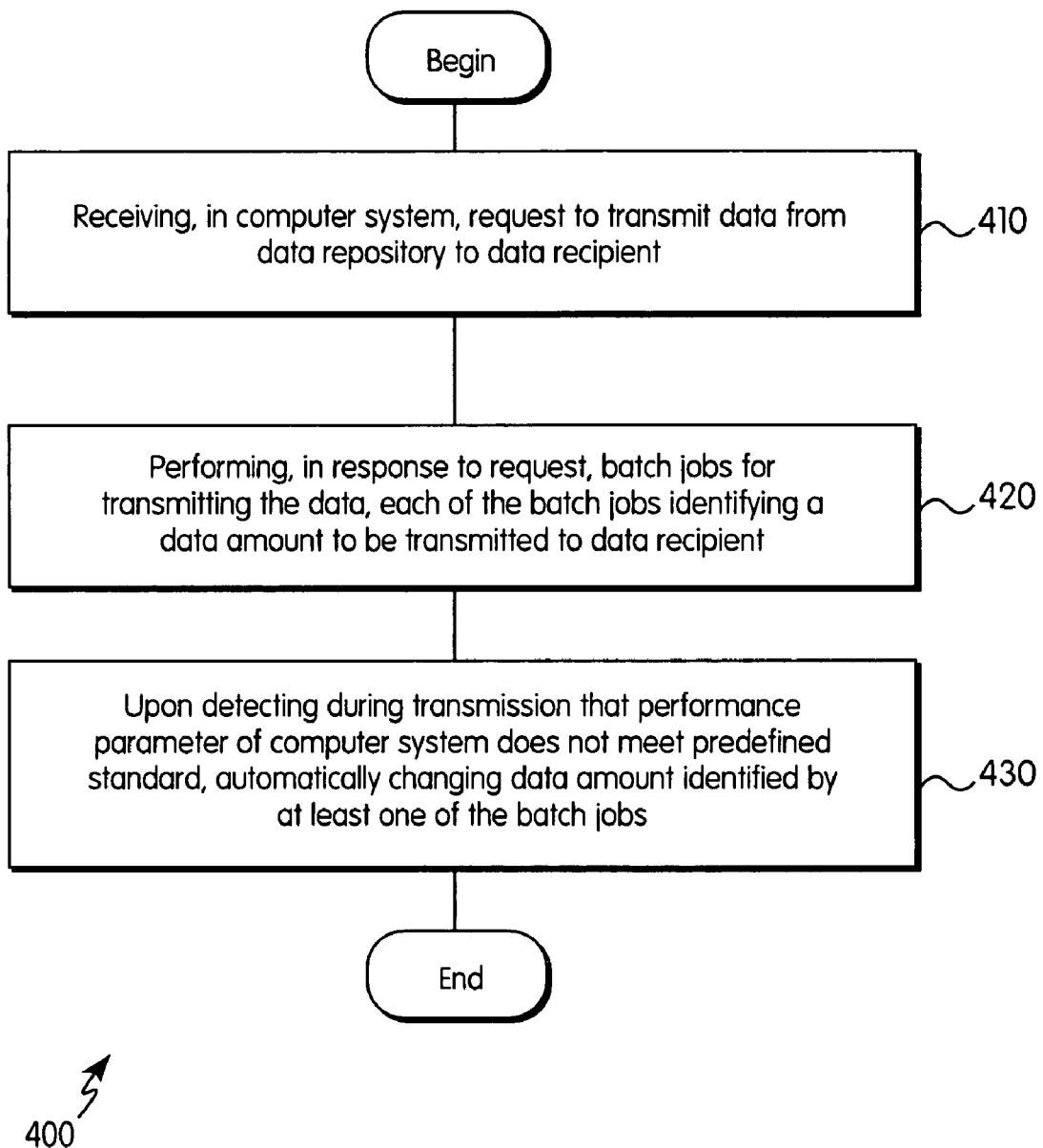
FIG. 4 is a flow chart of an embodiment of a first inventive method.

FIG. 4 is a flow chart of a method 400 that can be performed in organizing a transmission of repository data. The method 400 may be performed in the system 100. For example, a computer program product may include instructions that cause a processor to perform operations comprising the steps of the method 400. As shown in FIG. 4, the method 400 includes the following steps:

Receiving, in step 410 and in a computer system, a request to transmit data from a data repository to a data recipient. For example, the system 100 may receive a transmission request from a user or through an automatic scheduling. The request may involve transmitting data from the repository 102 to the indexing service 104 for creating or updating one or more indices for the search engines 106.

Performing, in step 420 and in response to the request, batch jobs for transmitting the data, each of the batch jobs identifying a data amount that is to be transmitted to the data recipient. The intelligent indexing system 110 may perform the batch jobs, for example using the concurrent indexing engine 114. Particularly, the concurrent indexing engine may include the job manager 204 which creates a batch job that is divided into subjobs in the batch job processing 206.

Upon detecting during transmission that a performance parameter of the computer system does not meet a predefined standard, automatically changing, in step 430, the data amount that is identified by at least one of the batch jobs. For example, at least one of first subjobs 306 may be split into the second subjobs 308. As another example, the system may merge third subjobs 310.

Figure 5:
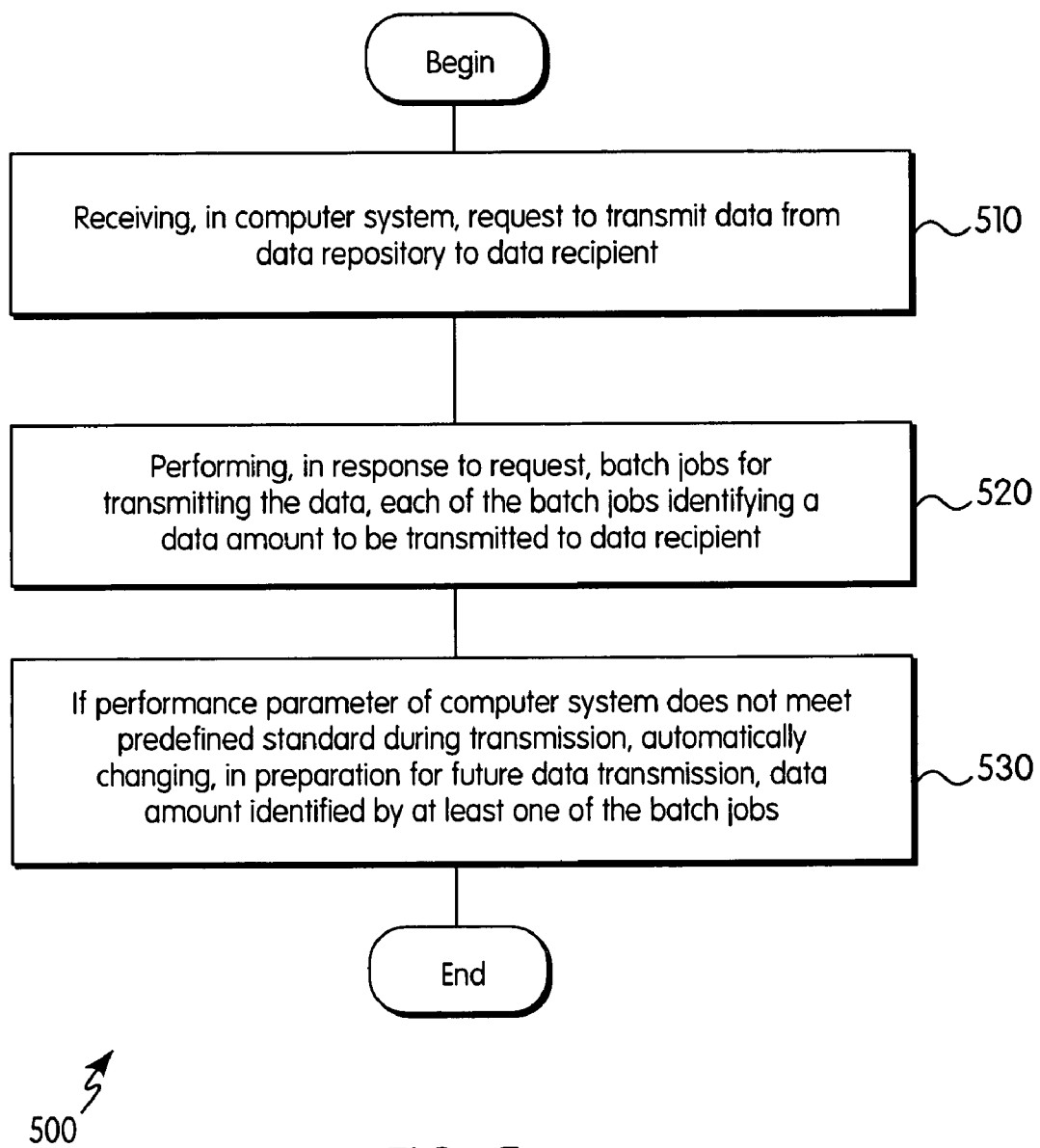
FIG. 5 is a flow chart of an embodiment of a second inventive method.

FIG. 5 is a flow chart of a method 500 that can be performed in organizing a transmission of repository data. The method 500 may be performed in the system 100 and involves changing a batch job's data amount in preparation for a future transmission. For example, a computer program product may include instructions that cause a processor to perform operations comprising the steps of method 500. As shown in FIG. 5, the method 500 includes the following steps:

Steps 510 and 520 in this embodiment are identical to steps 410 and 420, respectively, of method 400 shown in FIG. 4.

If a performance parameter of the computer system does not meet a predefined standard during transmission, the method 500 comprises automatically changing, in step 530 and in preparation for a future data transmission, the data amount identified by at least one of the batch jobs. For example, the system can change a setting that determines the number of the first subjobs 306 into which the first batch job is split upon initiation. As another example, the system can split at least one of first subjobs 306 into the second subjobs 308 in preparation for the future data transmission. As another example, the system may merge third subjobs 310. The change may be conditioned on a capacity of a system resource, such as whether the system tolerates increased memory use. Accordingly, performing the method 500 may improve the future data transmission by better organizing the batch jobs.

Figure 6:
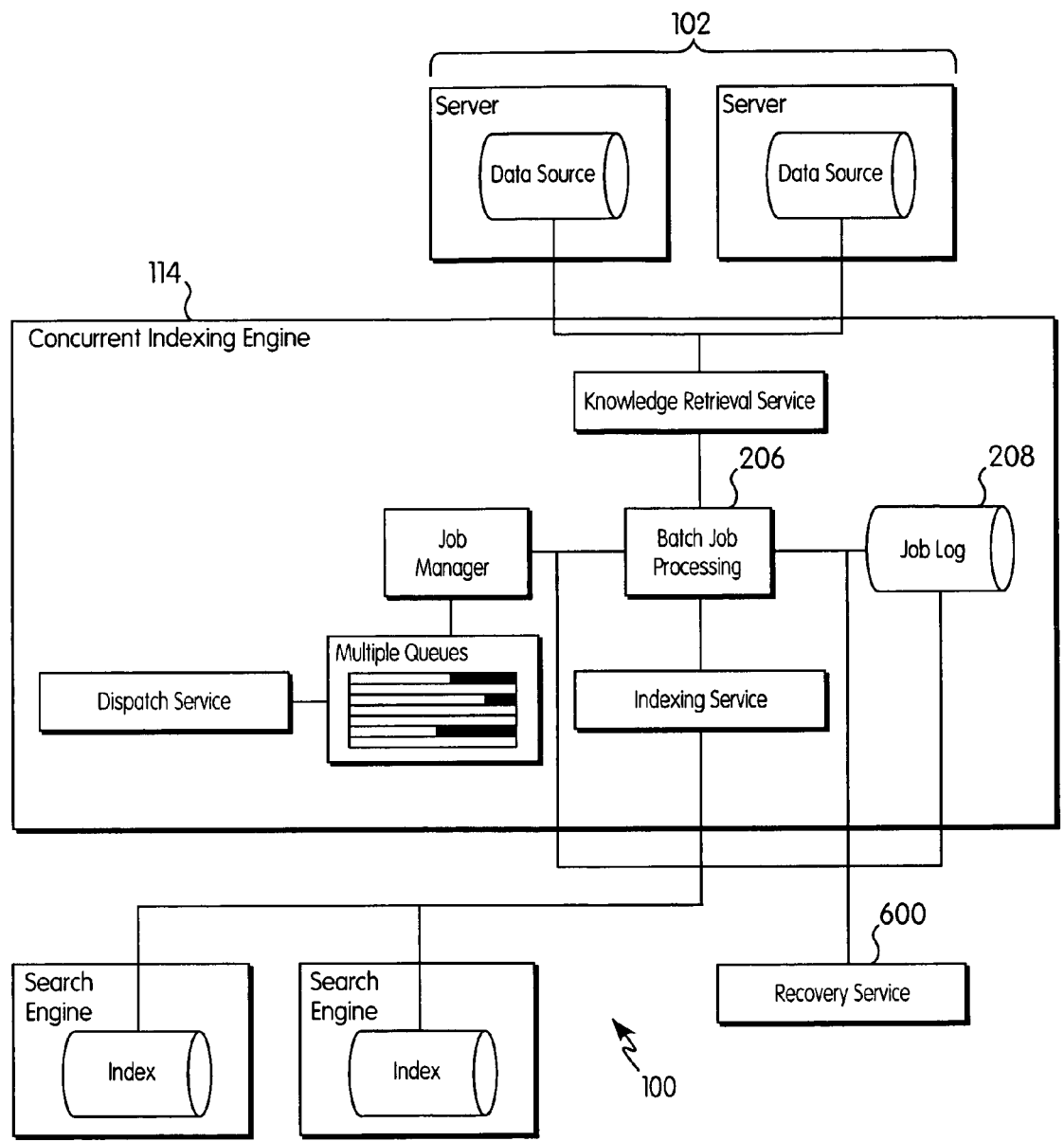
FIG. 6 is another example of components included in the system shown in FIG. 1.

One or more batch jobs may fail during a data transmission, and it will now be described with reference also to FIG. 6 how the system 100 can deal with such failures. For example, one or more knowledge entities in the data repository 102 is not retrieved upon performing the batch job. This may be due to a retrieval problem in the intelligent indexing system 110, or in the concurrent indexing engine 114, or in the batch job processing 206, or because the data repository 102 cannot provide the sought knowledge entity upon request, to name just a few examples. Regardless of the reason for not retrieving the knowledge entity, its absence from the indexing process means that its contents will not be included in the index that is being created or updated.

The system 100 may therefore keep track of failed batch jobs. For example, the batch jobs in which one or more knowledge entities are not retrieved may be registered in the job log 208. Accordingly, in the system 100, failure in retrieving one knowledge entity, such as a document, may lead to the batch job being deemed a failure. Different failure standards may be used.

The system 100 may include a recovery service 600 for dealing with one or more failed batch jobs. Particularly, the recovery service may provide that one or more recovery procedures can be performed upon detecting a batch job failure. The recovery procedure may comprise later making at least one other attempt at performing the failed batch job. Such a recovery procedure may be initiated by the batch job and is therefore referred to as a localized self-recovery. If the system can determine, for example from a failure record in the job log 208, which of the batch job's several knowledge entities that was not retrieved from the data repository 102, the system may eliminate that knowledge entity in the renewed attempt. If the system in this later attempt successfully transmits the remaining knowledge entities, it may register the failing knowledge entity in the job log 208 to be dealt with separately.

There may be several failed batch jobs, and the recovery procedure may comprise later making at least one other attempt at performing the several failed batch jobs. If any of the failed batch jobs again fail, the system may create a list of them in the job log 208. Later, the system can launch a transmission job that comprises the batch jobs included in the list. When a failed batch job has been divided into batch subjobs, the recovery procedure may comprise collecting job information about the subjobs and creating a list of repository data identified by the subjobs that failed. For example, the job information may be collected from the job log 208. The system may thereafter again perform the first batch job, this time to retrieve the repository data included in the list. A recovery procedure that creates lists for later attempting to recover multiple failed batch jobs may be referred to as a global self-recovery procedure.

The system may include an automatic re-start function for certain types of failures, or for particular batch jobs. The recovery procedure may then comprise determining whether the failed batch job can be automatically re-started. When the failed batch job can be automatically re-started, the recovery procedure may collect job information about subjobs of the failed batch job and create a list of repository data identified by the subjobs. Moreover, the recovery procedure may automatically re-start the failed batch job to transmit the repository data included in the list.

If the system determines that the failed batch job cannot be automatically re-started, the recovery procedure may collect job information about subjobs of the failed batch job and create a list of repository data identified by the subjobs. Moreover, the recovery procedure may output the list to a user, for example in a graphical user interface available to a system administrator. The user may trigger re-start of any of the batch subjobs that failed. The user may also report the specific knowledge entities that cause repeated indexing failure. The information is very useful in problem diagnosis and fixing because the error can be reproduced for a specific set of knowledge entities.

Figure 7:
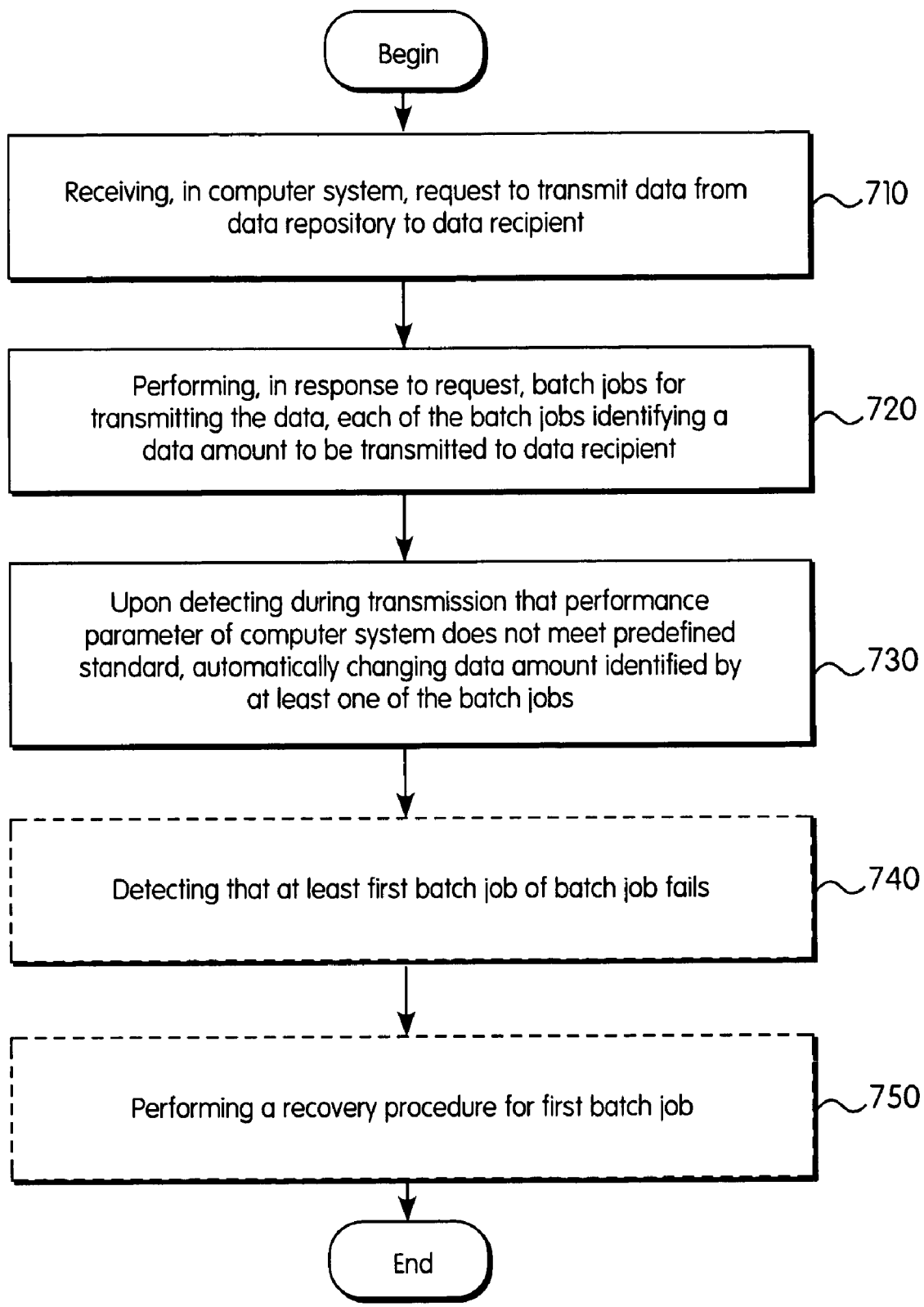
FIG. 7 is a flow chart of another embodiment of the first inventive method.

FIG. 7 is a flow chart of another embodiment of method 400. For example, a computer program product may include instructions that cause a processor to perform operations comprising the steps of the method 400 shown in FIG. 7. As shown in FIG. 7, the method 400 includes the following steps:

Steps 710, 720 and 730 in this embodiment are identical to steps 410, 420 and 430, respectively, of method 400 as shown in FIG. 4.

Detecting, in optional step 740, that at least a first batch job of the batch jobs fails. For example, the system detects that one of the first batch subjobs 306 fails.

Performing, in optional step 750, a recovery procedure for the first batch job. For example, the recovery procedure can include later making at least one other attempt at performing the first batch job. As another example, when the first batch job can be automatically re-started, the recovery procedure may comprise collecting job information about subjobs of the failed batch job, creating a list of repository data identified by the subjobs, and automatically re-starting the failed batch job to transmit the repository data included in the list.

Figure 8:
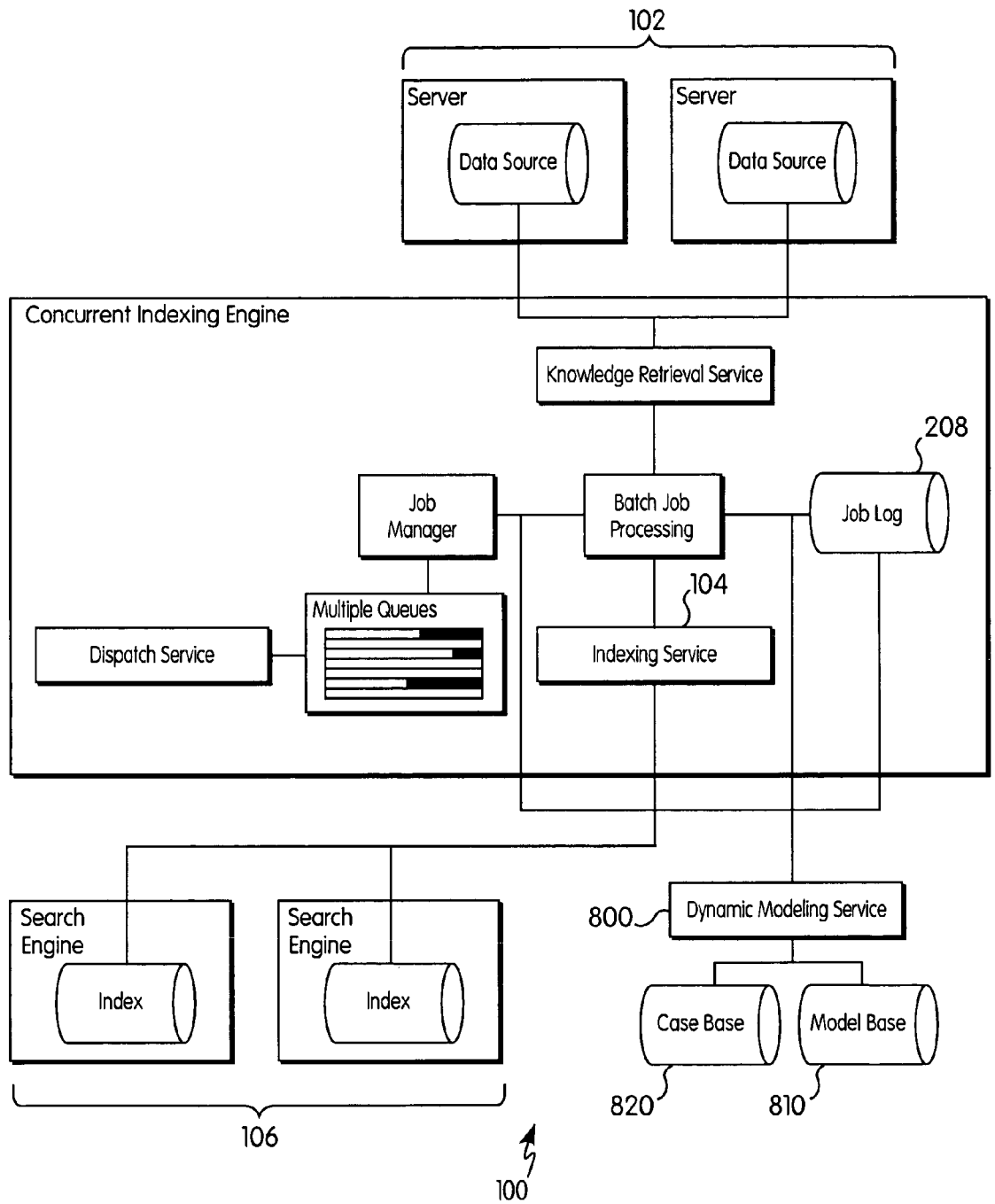
FIG. 8 is another example of components included in the system shown in FIG. 1.

A system that organizes a transmission of repository data may make use of one or more models for the organization of batch jobs, as will now be described with reference also to FIG. 8. Here, the system 100 additionally includes a dynamic modeling service (DMS) 800 that can monitor the organizational behavior of the system 100 to create or update a predictive model in a model base 810. When a transmission job is to be initiated, the DMS may access one or more model in the model base to predict an organization state with which to begin the transmission job. Beginning the job with a predicted optimal state may reduce the time it takes for the system to undergo the organization changes to reach that state. In other words, the system may feed the batch job processing 206 a beginning state that is closer to an optimal organization state than a state with which the processing would otherwise start.

For example, the DMS can create a predictive model by accessing, following transmission of one or more indexing jobs, information stored in the job log 208. This information may specify the overall size of the job, the types of knowledge entities, data about splits and mergers among the batch jobs or about the numbers of batch jobs being executed or about the number of levels of batch subjobs, to name a few examples. Moreover, the DMS can access information about system conditions during the transmission of the previous job(s), such as a record of any performance parameter that relates to changing sizes of batch jobs. The DMS can analyze the accessed information to create a model that associates a particular state of the system with an organization state of the batch jobs. The model, in turn, can be used to predict an organization state based on current system conditions and the specifics of the transmission job to be performed.

Particularly, the predictive model can output a control parameter that can be assigned to the batch jobs, wherein assigning the control parameter comprises specifying the organization state. Examples of the control parameter will now be given.

The control parameter may specify that any of the batch jobs can be split into a number of batch subjobs. For example, the control parameter may be a permitted range for the number of batch subjobs, such as "at most ten batch subjobs" or "always use 10-20 batch subjobs."

The control parameter may specify that any of the batch jobs can be split into a number of levels of batch subjobs. For example, the control parameter may be a permitted range for the number of levels of batch subjobs, such as "at most three levels of batch subjobs" or "always use 2-6 levels of batch subjobs."

The control parameter may specify that the data amount identified by any of the batch jobs can include a number of knowledge entities. For example, the control parameter may be a permitted range for the number of knowledge entities, such as "at most 5,000 documents per batch job" or "always include 1,000-10,000 documents per batch job."

The control parameter may specify a volume of the data amount identified by any of the batch jobs. For example, the control parameter may be a permitted range for the volume of the data amount, such as "at most 5 megabyte data per batch job" or "always use 1-10 megabyte data per batch job."

The control parameter may specify time-dependent information identified by any of the batch jobs. For example, the control parameter may be the recommended number of documents for the particular indexing time, such as "use 1000 documents per batch during non-office hours" or "no more than 30 batch jobs simultaneously during office hours."

The control parameter may be the predefined standard. That is, the model may predict how to set the threshold at which the system changes the batch job data amounts. By assigning the predicted performance parameter to the batch jobs the system can affect the organization of the batch jobs, in that a less restrictively set parameter may curb the organizing behavior (because it is more likely met by the system) and a restrictively set parameter may permit more frequent re-organization (because it is less likely met by the system).

Following initiation of the transmission job with the organization state produced by a predictive model, the system may allow re-organization as described above. That is, in a run time example, the control parameter may be assigned to specify the number of batch jobs for a new transmission and the system may thereafter initiate the new transmission job as specified by the control parameter. During the transmission, the system may monitor the performance parameter and automatically change the data amount identified by any of the new batch jobs if the performance parameter does not meet the predefined standard. The predefined standard may be made less restrictive for the new transmission job than for the previous transmission(s). This may cause the system to re-organize the batch jobs less frequently, because it is easier for the performance parameter to meet the predefined standard. The standard may be relaxed to reduce the likelihood that the system, due to possibly extensive re-organization, will stray too far away from the predicted state obtained using the model.

The predictive model(s) may be updated based on the completion of additional transmission jobs. That is, the system 100 may monitor a new data transmission, optionally store the monitoring record in the job log 208, and update the predictive model based on the monitoring. Updating the model may comprise adding more information regarding organization states assumed by the transmission job, such as the number and volumes of batch jobs, levels of batch jobs, and the value(s) of the performance parameter. As another example, the model may be updated to reflect that the transmission job entered into an unstable, anomalous or chaotic state.

If the predictive model permits a partial update, the system may maintain the model subsequent to the partial update. When, in contrast, the model does not permit a partial update, the system may add new organization information to organization information that already is part of the model. Such new organization information may be weighted, for example to give the more recent information a greater impact on the model than older information. Whether a predictive model permits a partial update or not may depend on different demands of indexing processes. For example, if a company's system landscape foresees significant information structure changes or dramatic changes of demands, the predictive model may require more frequent updates for various situations. Then, a partial update may be desirable. On the contrary, if a company is already in a routine and regular process, there may be no need to partially update the model since the existing model may already be optimized for most operations.

Figure 9:
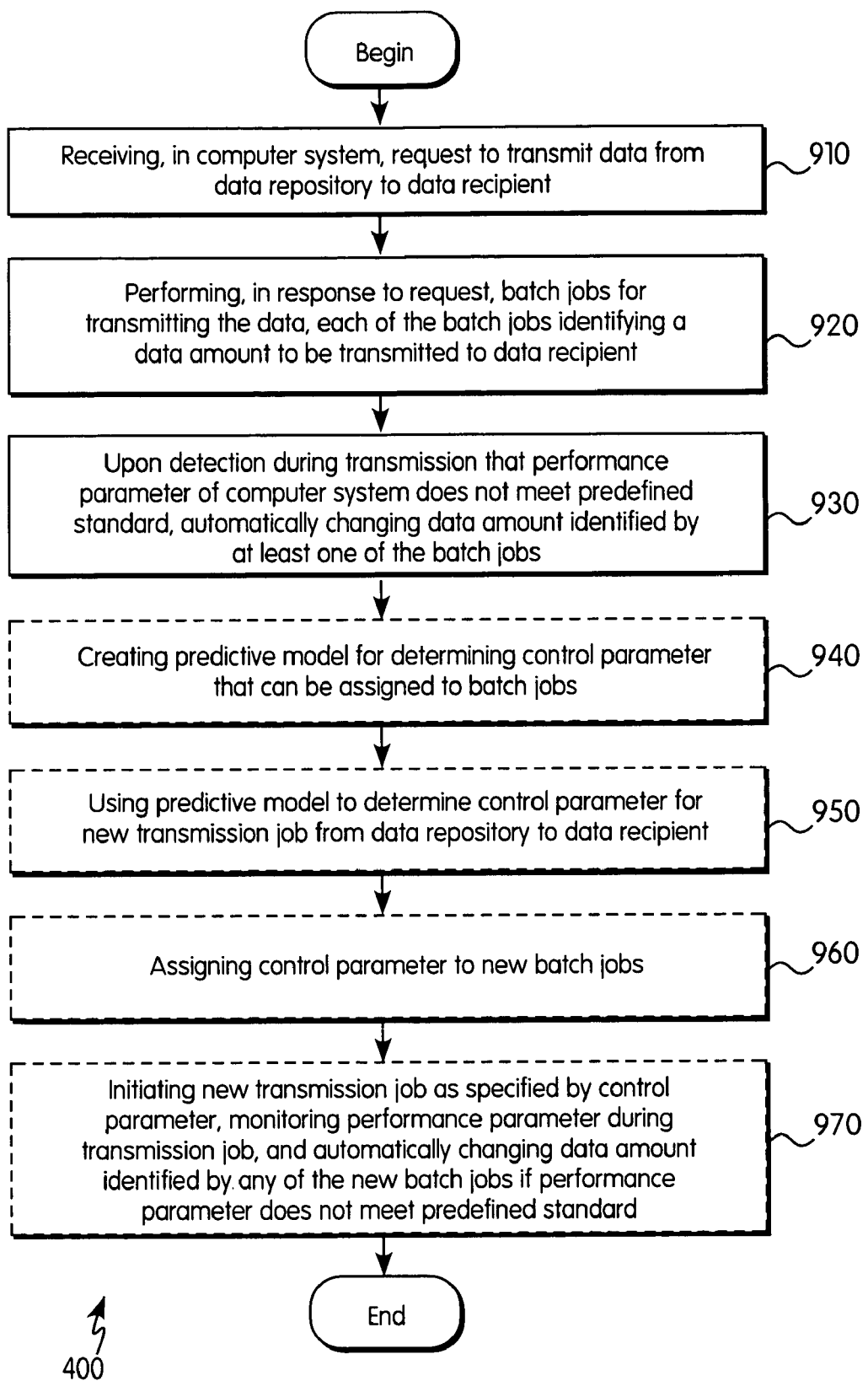
FIG. 9 is a flow chart of another embodiment of the first inventive method.
Figure 10:
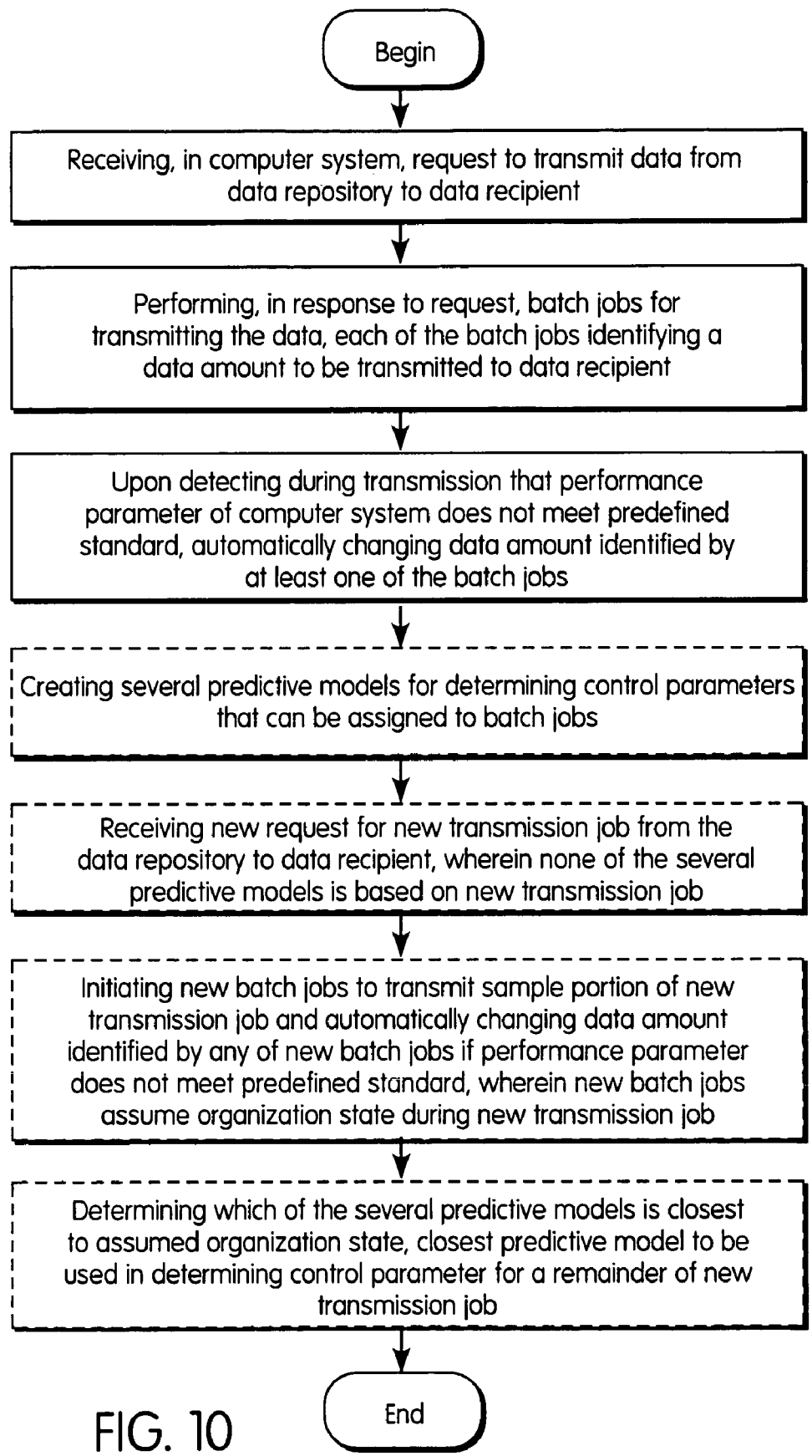
FIG. 10 is a flow chart of another embodiment of the first inventive method.

FIG. 9 is a flow chart of another embodiment of method 400. For example, a computer program product may include instructions that cause a processor to perform operations comprising the steps of the method 400 shown in FIG. 9. As shown in FIG. 9, the method 400 includes the following steps:

Steps 910, 920 and 930 in this embodiment are identical to steps 410, 420 and 430, respectively, of method 400 as shown in FIG. 4.

Creating, in optional step 940, a predictive model for determining a control parameter that can be assigned to the batch jobs. For example, the DMS 800 may monitor transmission of indexing job(s) in the system 100, such as by retrieving information from the job log 208. The DMS may store the created model(s) in the model base 810.

Using, in optional step 950, the predictive model to determine the control parameter for a new transmission job from the data repository to the data recipient. The determined control parameter may be an organization state that is optimized for the type of transmission job that is to be performed. For example, the predictive model can determine the number of batch jobs to be used, or into how many levels of batch subjobs the batch jobs can be split.

Assigning, in optional step 960, the control parameter to the new batch jobs. For example, assigning the control parameter may comprise specifying the number of the new batch jobs.

Initiating, in optional step 970, the new transmission job as specified by the control parameter. The performance parameter may be monitored during the transmission job. If the performance parameter does not meet the predefined standard during the transmission, the system may automatically change the data amount identified by any of the new batch jobs. Accordingly, the system may permit splits and mergers that change the organization state defined by the control parameter. The predefined standard may be adjusted because the transmission is initiated with a model-predicted organization state.

Using a predictive model may be advantageous in selecting an organization state for a relatively well known transmission job that is identical or similar to previously performed jobs and that involves the same data source(s). A question may arise, however, as to what predictive model to select for a new transmission job that is neither identical nor apparently similar to previously performed jobs. It is possible to initiate the new transmission job in the system 100 and let the concurrent indexing engine 114 regulate the organization state by changing the batch job data amounts based on the performance parameter. However, it may be more efficient for the system to initiate the new transmission job with an organized state that is based on some model prediction. Thus, the system should choose a model.

Choosing between predictive models may involve a sampling and matching procedure. For example, the DMS 800 may identify a sample portion of the new transmission job and initiate batch jobs to transmit the sample portion. The DMS will monitor the organization state assumed by the batch jobs for the sample portion and use this information to select one of the predictive models. The system therefore initiates the batch jobs and changes the respective data amounts they identify, for example by splitting or merging, based on a performance parameter. The DMS may then compare the assumed organization state with the predictive models and determine which of them is closest to the state.

The organization state assumed by the batch jobs of the sample transmission is determined by collecting information about the transmission. For example, the following information can be collected: a number of batch subjobs that the new batch jobs are split into, a number of levels of the batch subjobs, a number of knowledge entities identified by each of the new batch jobs, a volume of the data amount identified by each of the new batch jobs, and combinations thereof. Additional performance information, such as an average data processing time, current system load or other system restrictions, may also be used to compare the state with the predictive models.

The DMS 800 inputs characteristics of the sample transmission and information on existing system conditions into some or all of the predictive models. Each of the models will produce a response that predicts what organization state the batch jobs should assume under the given conditions. The DMS compares these model responses with the organization state assumed when transmitting the sample job. The model that is closest is selected to predict a control parameter to be used for a remainder of the new transmission job.

Upon obtaining the control parameter, the remainder of the new transmission job can be initiated with the predicted organization state. The system can allow further re-organization of the batch jobs for the remainder job; for example by changing the batch job data portions based on a system performance parameter. The performance parameter may be made less restrictive for the remainder of the new transmission job.

It may be advantageous to group the predictive models into several clusters to determine which model is closest to the assumed organization state. For example, clustering may be performed when the model base 810 includes a large number of predictive models. The DMS 800 can analyze the created predictive models and group into one cluster those models that make similar predictions in one respect, and group into another cluster those models whose predictions are similar in another respect. The clusters may be stored in a case base 820 (see FIG. 8). For example, models that under given conditions predict that a relatively small number of batch jobs should be used, perhaps in the order of ten batch jobs, can be clustered together. In contrast, models predicting a large number of batch jobs, perhaps over one hundred batch jobs, can be grouped in a different cluster.

Upon performing the sample batch job(s), the DMS 800 can compare the assumed organization state with the several clusters to determine which one is closest. Accordingly, in such implementations it may be sufficient to subsequently obtain predictions only from the models that are included in the selected cluster, and not for all of the predictive models. The obtained predictions can then be compared with the assumed organization state to select the closest one of the cluster models. The system may use a default selection for the situation that none of the clusters is similar to the sample organization state, such as by selecting the cluster that has the closest response time, meaning the time elapsed from a time stamp to completing the job.

When models are grouped into clusters, it may be desirable to determine which cluster a newly created model should belong to, or to evaluate whether an updated model should be kept in the same, or regrouped into another, cluster. The DMS 800 may use a similarity index for this purpose. The DMS may retrieve collected data for the completed job(s) upon which the new or updated model is based. The DMS may retrieve the existing models and their cluster information. Using the collected job data, the DMS obtains organization states from all existing models. The DMS then computes the similarity index between the collected data and the predictions for all models, ranks the indices and selects the most similar cluster. If none of the existing clusters is a close match the DMS may create a new cluster for the new or updated model.

The predictive models described above may be quantitative models that require substantial system processing to produce their responses. Moreover, a comprehensive mathematical model may be too complex for a non-expert person to understand, in the sense of grasping what factor or factors cause the model to make one prediction or another. It may therefore be advantageous to extract from a predictive model one or more variables that significantly contribute to the model's prediction. Such a variable can be presented to a user who may thereby gain valuable insight about system conditions or job characteristics that impact job transmission.

Figure 11:
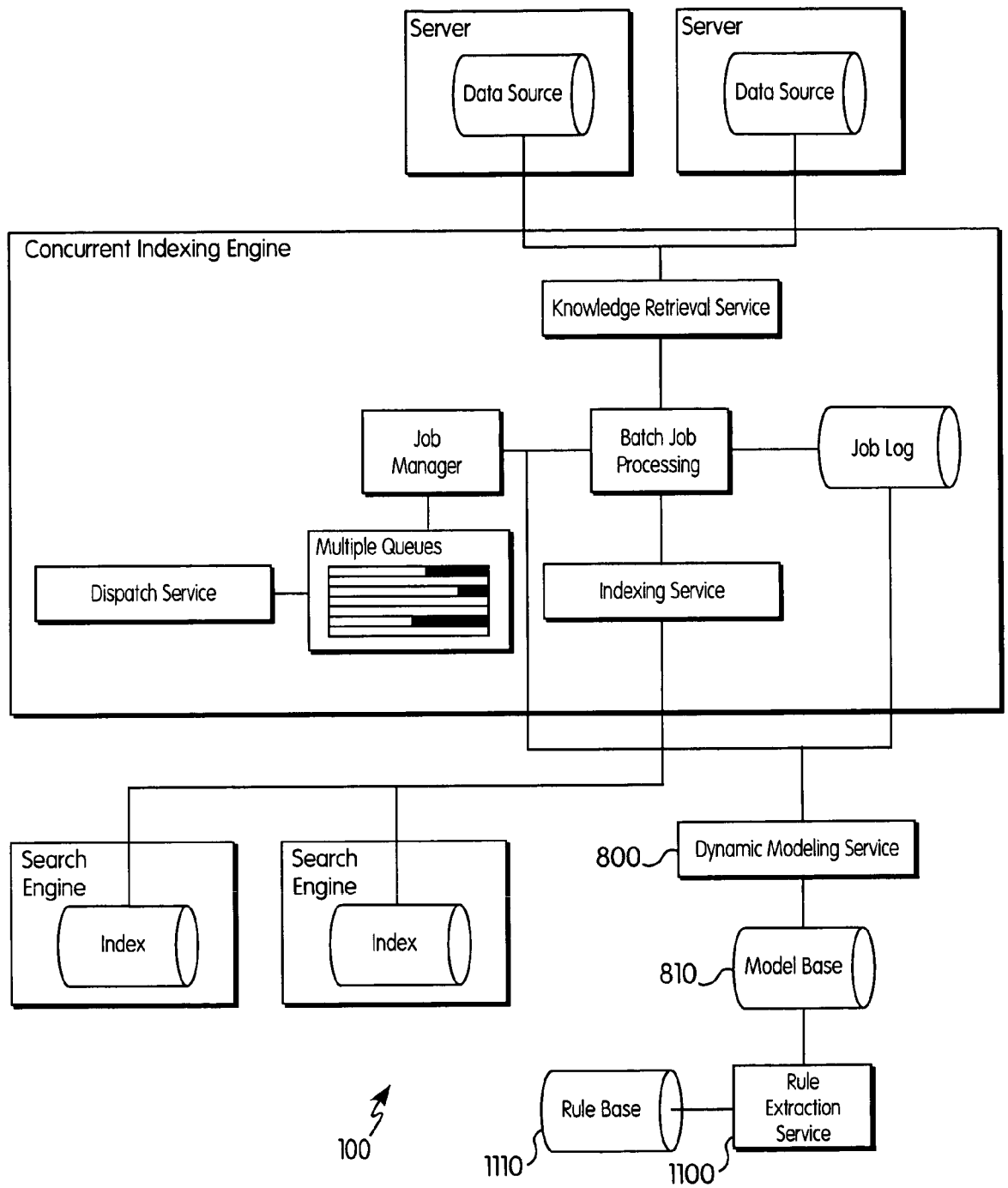
FIG. 11 is another example of components included in the system shown in FIG. 1.

FIG. 11 shows that the system 100 can include a rule extraction service (RES) 110 that analyzes contents in the model base 810. Particularly, the RES may identify one or more variables that influence the predictions of a particular model, and then determine which of the variables makes the most significant contribution to the prediction. This variable can be presented to the user as an indication of what causes the system 100 to assume a particular organization state.

For example, the RES 1100 may reduce the mathematical complexity of the predictive model by determining the main predictors in organization information from the transmissions. This may involve using factor or component analysis on data used by the model. Moreover, the RES may reduce the organization information to include only the main predictors, and use the reduced information to construe a decision tree that can be understood by the user. That is, the decision tree may include a series of questions regarding the main predictors, and with the different possible answers leading to the various predictions made by the predictive model. Such a decision tree may allow the user to see how changing a system condition (such as memory space or processor capacity), or a characteristic of the transmission job (such as the number of knowledge entities or the types of documents) may affect job transmission. The decision tree can be stored in a rule base 1110 that is accessible to the RES.

Another example is that the RES can formulate a rule for the extracted variable. The rule can be used to estimate a value for the extracted variable and may therefore be thought of as a reduction of the model into a user-comprehensible rule, such as "if there are more than 50 batch jobs, create no more than 20 subjobs per batch job." The rule can be stored in the rule base 1110.

The decision tree or the formulated rule can be presented to a user to aid decision-making or system changes. For example, one of them or both can be used by a knowledge administrator or a system administrator to investigate the transmission process for locating bottlenecks and other undesirable aspects. Accordingly, the user may make one or more changes, in preparation for a future data transmission, based on the presented information. Alternatively, the RES 1100 can collect available information, run it against the decision tree or the formulated rule, and thus obtain a control parameter without running the model prediction.

One advantage of the RES 1100 is that it can reduce or completely eliminate the processing load of mathematical computations during a runtime process. That is, determination of the significant variable(s) can be performed as a background task. Particularly, the RES may operate only when the response model needs to be generated or updated. Another advantage is that it makes it possible to draw benefits from the predictive models also in small or medium sized transmission jobs.

Figure 12:
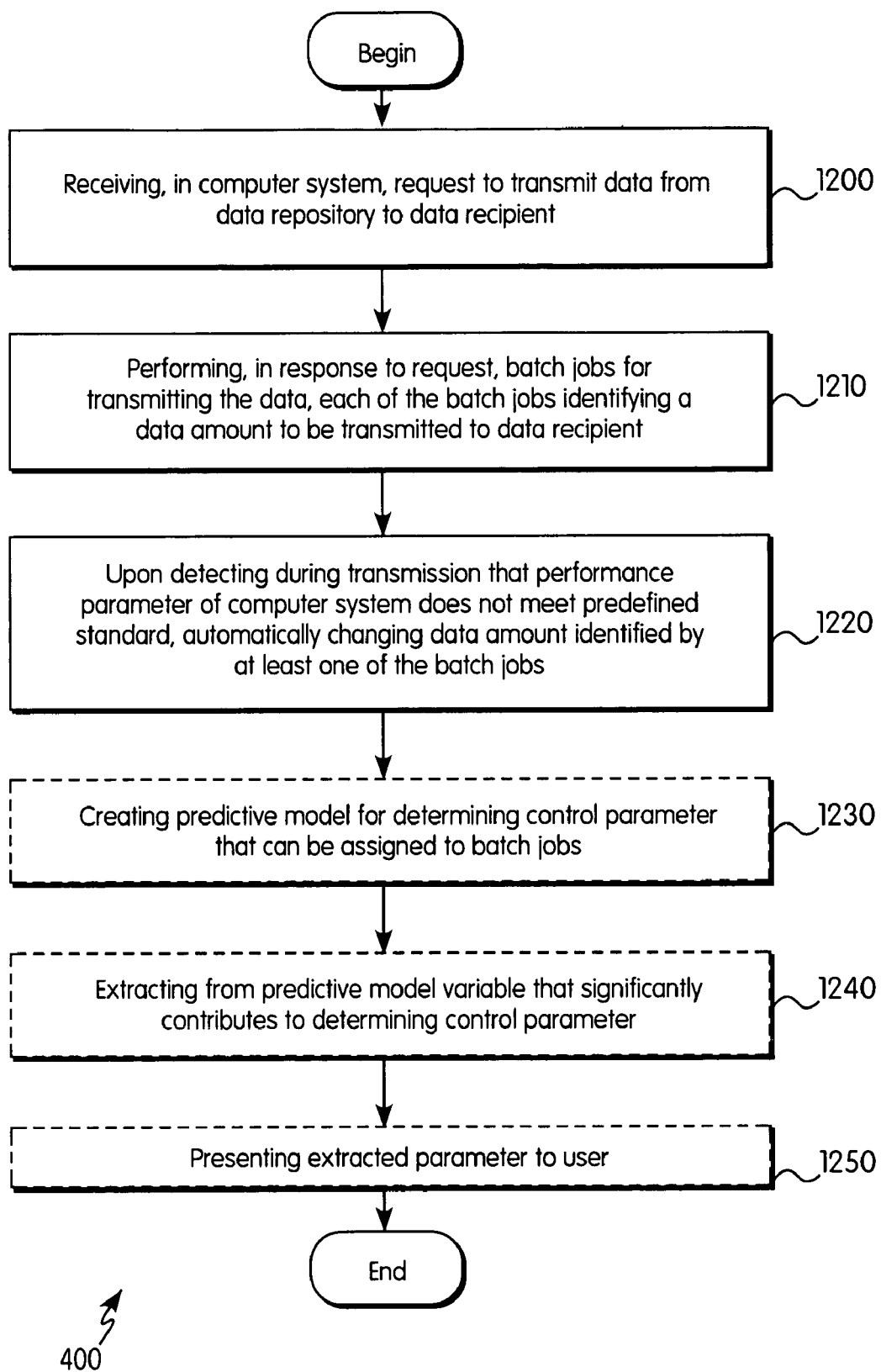
FIG. 12 is a flow chart of another embodiment of the first inventive method.

FIG. 12 is a flow chart of another embodiment of method 400. For example, a computer program product may include instructions that cause a processor to perform operations comprising the steps of the method 400 shown in FIG. 12. As shown in FIG. 12, the method 400 includes the following steps:

Steps 1200, 1210 and 1220 in this embodiment are identical to steps 410, 420 and 430, respectively, of method 400 as shown in FIG. 4.

Optional step 1230 in this embodiment is identical to optional step 940 of method 400 as shown in FIG. 9.

Extracting, in optional step 1240, from the predictive model a variable that significantly contributes to determining the control parameter. For example, the RES 1100 can determine a main predictor in organization information included in the predictive model.

Presenting, in optional step 1250, the extracted parameter to a user. For example, the RES 1100 may present the extracted variable on a display device. As another example, the RES may construe a decision tree and present the decision tree to the user. As another example, the RES may formulate and present a rule for the extracted variable, which rule can be used in determining a predicted value for the extracted variable.

Figure 13:
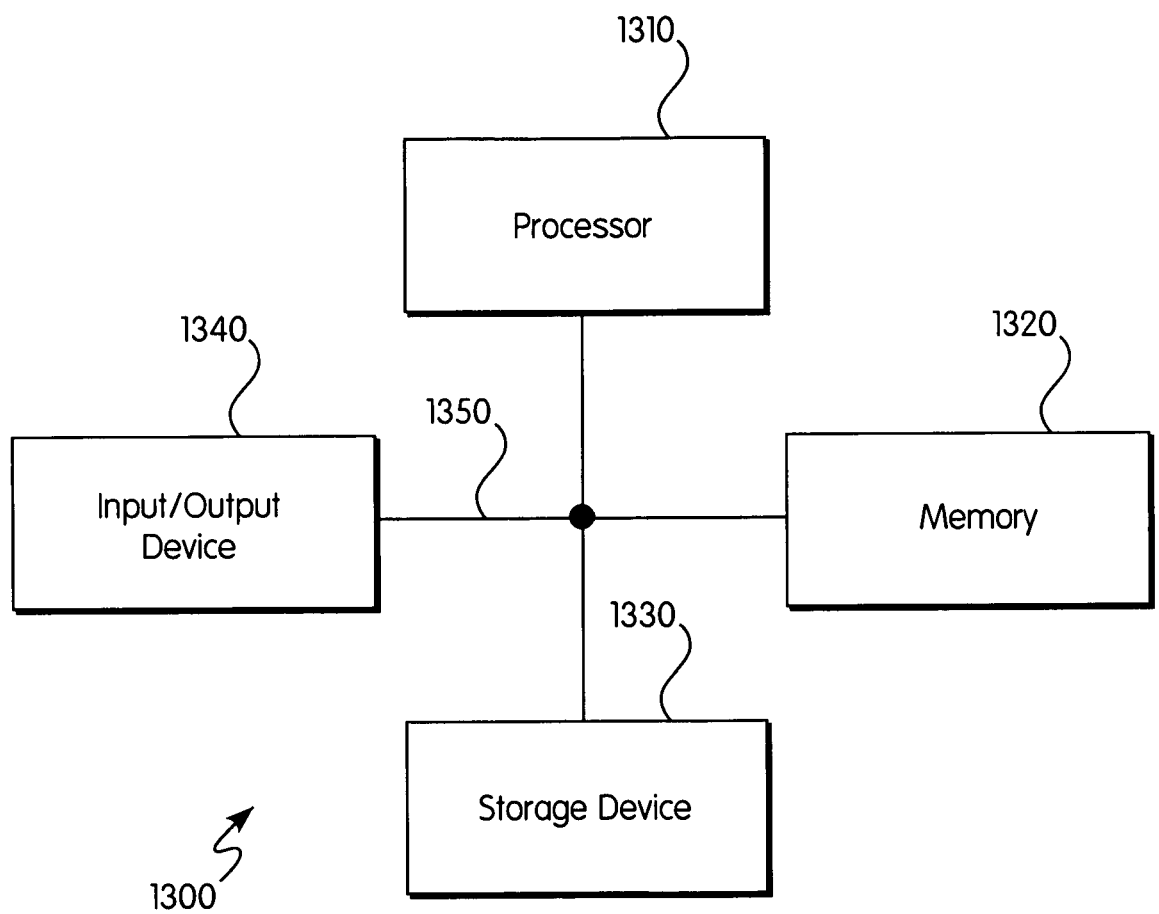
FIG. 13 is a block diagram of a general computer system.

FIG. 13 is a block diagram of a computer system 1300 that can be used in the operations described above, according to one embodiment. For example, one or more systems 1300 may be included in the system 100.

The system 1300 includes a processor 1310, a memory 1320, a storage device 1330 and an input/output device 1340. Each of the components 1310, 1320, 1330 and 1340 are interconnected using a system bus 1350. The processor 1310 is capable of processing instructions for execution within the system 1300. In one embodiment, the processor 1310 is a single-threaded processor. In another embodiment, the processor 1310 is a multi-threaded processor. The processor 1310 is capable of processing instructions stored in the memory 1320 or on the storage device 1330 to display graphical information for a user interface on the input/output device 1340.

The memory 1320 stores information within the system 1300. In one embodiment, the memory 1320 is a computer-readable medium. In one embodiment, the memory 1320 is a volatile memory unit. In another embodiment, the memory 1320 is a non-volatile memory unit.

The storage device 1330 is capable of providing mass storage for the system 1300. In one embodiment, the storage device 1330 is a computer-readable medium. In various different embodiments, the storage device 1330 may be a floppy disk device, a hard disk device, an optical disk device, or a tape device.

The input/output device 1340 provides input/output operations for the system 1300. In one embodiment, the input/output device 1340 includes a keyboard and/or pointing device. In one embodiment, the input/output device 1340 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of organizing a transmission of repository data, the method comprising:
   receiving, in a computer system, a request to transmit data from a data repository to a data recipient, the data being transmitted in a plurality of concurrently executing batch jobs;
   performing, in response to the request, batch jobs for transmitting the data, each of the batch jobs identifying a data amount that is to be transmitted to the data recipient, wherein each of the batch jobs having a control parameter assigned thereto that specifies an amount of data to be transferred by the corresponding batch job, wherein the control parameters are assigned to the batch jobs using one of a plurality of predictive models that is selected according to an organization state of the batch jobs; and
   upon detecting during transmission that a performance parameter of the computer system does not meet a predefined standard, automatically changing the data amount that is handled by at least one of the batch jobs, wherein automatically changing the data amount that is handled by at least one of the batch jobs comprises splitting the at least one of the batch jobs into at least two batch jobs upon determining that the computer system can support an increased system load;
   wherein:
   the organization state is determined by collecting information selected from a group comprising: a number of batch subjobs that the new batch jobs are split into, a number of levels of the batch subjobs, a number of knowledge entities identified by each of the new batch jobs, a volume of the data amount identified by each of the new batch jobs, and combinations thereof;
   the plurality of predictive models are grouped into clusters of predictive models making similar predictions; and
   the selected predictive model is selected based on which cluster is closest to the organization state.

2. The method of claim 1, wherein the batch jobs include a first batch job divided into batch subjobs, wherein the first batch job identifies a first data amount and each of the subjobs identifies a portion of the first data amount.

3. The method of claim 1, wherein automatically changing the data amount that is handled by at least one of the batch jobs comprises merging the at least one of the batch jobs with another of the batch jobs.

4. The method of claim 3, wherein the at least one of the batch jobs is merged with the other of the batch jobs upon detecting that the computer system cannot support an increased system load.

5. The method of claim 1, wherein performing at least one of the batch jobs comprises successively retrieving from the data repository portions of the data amount identified by the at least one of the batch jobs.

6. The method of claim 5, further comprising evaluating the performance parameter in association with retrieving each of the portions of the data.

7. The method of claim 1, further comprising:
   detecting that at least a first batch job of the batch jobs fails; and
   performing a recovery procedure for the first batch job.

8. The method of claim 7, wherein the recovery procedure comprises later making at least one other attempt at performing the first batch job.

9. The method of claim 8, further comprising eliminating, in making the at least one other attempt, a specific knowledge entity from a first data amount identified by the first batch job, the first batch job having failed because the specific knowledge entity was not retrieved from the data repository.

10. The method of claim 7, wherein the recovery procedure comprises identifying several of the batch jobs that fail.

11. The method of claim 10, wherein the recovery procedure comprises later making at least one other attempt at performing the several failed batch jobs, and creating a list of any of the several failed batch jobs that again fail.

12. The method of claim 11, further comprising launching a transmission job in the computer system, the transmission job comprising those of the several failed batch jobs that again fail.

13. The method of claim 7, wherein the first batch job is divided into batch subjobs, and wherein the recovery procedure comprises collecting job information about the batch subjobs and creating a list of repository data identified by the batch subjobs that failed.

14. The method of claim 13, wherein the recovery procedure comprises again performing the first batch job to transmit the repository data included in the list.

15. The method of claim 7, wherein the failed first batch job is detected upon accessing a job log for the batch jobs.

16. The method of claim 15, wherein the recovery procedure comprises determining whether the failed first batch job can be automatically re-staffed.

17. The method of claim 16, wherein the failed first batch job is divided into batch subjobs and can be automatically re-started, and wherein the recovery procedure comprises: collecting job information about the batch subjobs;
    creating a list of repository data identified by the batch subjobs that failed; and
    automatically re-staffing the failed first batch job to transmit the repository data included in the list.

18. The method of claim 16, wherein the failed first batch job is divided into batch subjobs and cannot be automatically re-started, and wherein the recovery procedure comprises: collecting job information about the batch subjobs;
    creating a list of repository data identified by the batch subjobs that failed; and
    outputting the list to a user, wherein the user can trigger re-start of any of the batch subjobs that failed.

19. The method of claim 1, wherein the data is embodied in knowledge entities in the data repository, the knowledge entities belonging to at least two different document types.

20. The method of claim 1, wherein the performance parameter is selected from the group consisting of: processing times per knowledge entity for the batch jobs, how much of the data is processed per unit of time, an average processing time for a complete retrieval, a request-response time for another application in the computer system, and combinations thereof.

21. The method of claim 1, wherein the transmission is one selected from the group consisting of: an initial transmission of the data from the data repository, a periodic transmission of the data from the data repository, and combinations thereof.

22. The method of claim 1, wherein the data is transmitted from several data repositories including the data repository.

23. The method of claim 1, wherein the data is transmitted to the data recipient for indexing.

24. The method of claim 23, wherein the indexing is for several search engines.

25. The method of claim 1, wherein the predictive model is created by monitoring data amount changes in the batch jobs during the transmission.

26. The method of claim 25, wherein monitoring the data amount changes during the transmission comprises monitoring information selected from the group consisting of:
    automatic mergers of at least two of the batch jobs;
    automatic splits of at least one of the batch jobs;
    the performance parameter; and combinations thereof.

27. The method of claim 1, wherein the control parameter specifies that any of the batch jobs can be split into a number of batch subjobs.

28. The method of claim 27, wherein the control parameter is a permitted range for the number of batch subjobs.

29. The method of claim 1, wherein the control parameter specifies that any of the batch jobs can be split into a number of levels of batch subjobs.

30. The method of claim 29, wherein the control parameter is a permitted range for the number of levels of batch subjobs.

31. The method of claim 1, wherein the control parameter specifies that the data amount identified by any of the batch jobs can include a number of knowledge entities.

32. The method of claim 31, wherein the control parameter is a permitted range for the number of knowledge entities.

33. The method of claim 1, wherein the control parameter specifies a volume of the data amount identified by any of the batch jobs.

34. The method of claim 33, wherein the control parameter is a permitted range for the volume of the data amount.

35. The method of claim 1, wherein the control parameter is the predefined standard.

36. The method of claim 1, wherein the predictive model is used to determine the control parameter for a new transmission job from the data repository to the data recipient.

37. The method of claim 36, wherein the new transmission job includes a number of new batch jobs, further comprising assigning the control parameter to the new batch jobs.

38. The method of claim 37, wherein assigning the control parameter to the new batch jobs comprises specifying the number of the new batch jobs.

39. The method of claim 37, further comprising
    initiating the new transmission job as specified by the control parameter;
    monitoring the performance parameter during the transmission job; and
    automatically changing the data amount handled by any of the new batch jobs if the performance parameter does not meet the predefined standard.

40. The method of claim 39, further comprising making the predefined standard less restrictive for the new transmission job than for the transmission performed in response to the request.

41. The method of claim 1, wherein determining the closest predictive model comprises:
    determining model organization states using each of the several predictive models; comparing the model organization states to the organization state that relates to the small portion of the new transmission job; and
    selecting one of the several predictive models whose model organization state is most similar to the organization state.

42. The method of claim 41, wherein determining the model organization states comprises using performance information measured for the new batch jobs.

43. The method of claim 1, further comprising:
    initiating additional batch jobs for a remainder of the new transmission job, the additional batch jobs having assigned thereto the control parameter determined using the closest predictive model; and automatically changing the data amount handled by any of the additional new batch jobs if the performance parameter does not meet the predefined standard.

44. The method of claim 43, further comprising making the predefined standard less restrictive for the remainder of the new transmission job than for the transmission performed in response to the request.

45. The method of claim 1, further comprising:
extracting from the predictive model a variable that significantly contributes to determining the control parameter.

46. The method of claim 45, wherein the predictive model includes organization information from the transmission, and wherein extracting the variable comprises:
determining a main predictor in the organization information; and
reducing the organization information to the main predictor.

47. The method of claim 46, further comprising using the reduced organization data in construing a decision tree for the extracted variable, which decision tree can be used in determining a predicted value for the extracted variable.

48. The method of claim 45, further comprising formulating a rule for the extracted variable, wherein the rule can be used in determining a predicted value for the extracted variable.

49. The method of claim 45, wherein the user makes a change, in preparation for a future data transmission, based on the extracted variable.

50. The method of claim 1, further comprising:
monitoring a new data transmission from the data repository to the data recipient; and
updating the predictive model based on monitoring the new data transmission.

51. The method of claim 50, wherein the predictive model permits a partial update, further comprising maintaining the predictive model subsequent to the partial update.

52. The method of claim 50, wherein the predictive model is based on organization information and does not permit a partial update, further comprising adding new organization information to the organization information.

53. The method of claim 52, further comprising weighting the new organization information in the predictive model.

54. A computer program product tangibly embodied in a storage medium for storing the computer program product, the computer program product including instructions that, when executed, cause a processor to perform operations comprising:
receive, in a computer system, a request to transmit data from a data repository to a data recipient; the data being transmitted in a plurality of concurrently executing batch jobs;
perform, in response to the request, batch jobs for transmitting the data, each of the batch jobs identifying a data amount that is to be transmitted to the data recipient, wherein each of the batch jobs having a control parameter assigned thereto that specifies an amount of data to be transferred by the corresponding batch job, wherein the control parameters are assigned to the batch jobs using one of a plurality of predictive models that is selected according to an organization state of the batch jobs; and
upon detecting during transmission that a performance parameter of the computer system does not meet a predefined standard, automatically change the data amount that is identified by the control parameter corresponding to at least one of the batch jobs, wherein at least one of the batch jobs is split into at least two batch jobs upon detecting that the computer system can support an increased memory use;

wherein:
the organization state is determined by collecting information selected from a group comprising: a number of batch subjobs that the new batch jobs are split into, a number of levels of the batch subjobs, a number of knowledge entities identified by each of the new batch jobs, a volume of the data amount identified by each of the new batch jobs, and combinations thereof;
the plurality of predictive models are grouped into clusters of predictive models making similar predictions; and
the selected predictive model is selected based on which cluster is closest to the organization state.

55. A method of organizing a transmission of repository data, the method comprising:
receiving, in a computer system, a request to transmit data from a data repository to a data recipient, the data being transmitted in a plurality of concurrently executing batch jobs;
performing, in response to the request, batch jobs for transmitting the data, each of the batch jobs having an associated control parameter identifying a data amount that is to be transmitted to the data recipient, wherein the control parameter is assigned to each batch job using one of a plurality of predictive models; and
if a performance parameter of the computer system does not meet a predefined standard during transmission, automatically changing, in preparation for a future data transmission, the control parameters which in turn automatically changes the data amount handled by at least one of the batch jobs, wherein at least one of the batch jobs is split into at least two batch jobs upon detecting that the computer system can support an increased memory use;

wherein:
the predictive model is selected based on a determined organization state, the organization state being determined by collecting information selected from a group comprising: a number of batch subjobs that the new batch jobs are split into, a number of levels of the batch subjobs, a number of knowledge entities identified by each of the new batch jobs, a volume of the data amount identified by each of the new batch jobs, and combinations thereof;
the plurality of predictive models are grouped into clusters of predictive models making similar predictions; and
the selected predictive model is selected based on which cluster is closest to the organization state.

56. The method of claim 55, wherein automatically changing the data amount that is handled by at least one of the batch jobs comprises merging the at least one of the batch jobs with another of the batch jobs.

57. The method of claim 56, wherein the at least one of the batch jobs is merged with the other of the batch jobs upon detecting that the computer system can not support an increased memory use.

58. A computer program product tangibly embodied in a storage medium for storing the computer program product, the computer program product including instructions that, when executed, cause a processor to perform operations comprising:

receive, in a computer system, a request to transmit data from a data repository to a data recipient, the data being transmitted in a plurality of concurrently executing batch jobs;

perform, in response to the request, batch jobs for transmitting the data, each of the batch jobs having an associated control parameter identifying a data amount that is to be transmitted to the data recipient; and if a performance parameter of the computer system does not meet a predefined standard during transmission, automatically change, in preparation for a future data transmission, the data amount handled by at least one of the batch jobs, wherein at least one of the batch jobs is split into at least two batch jobs upon detecting that the computer system can support an increased memory use and wherein at least two of the batch jobs are merged into a single batch job upon detected that the computing system cannot support an increased memory use;

wherein:
the control parameters are assigned to the batch jobs using one of a plurality of predictive models that is selected according to an organization state of the batch jobs, the organization state being determined by collecting information selected from a group comprising: a number of batch subjobs that the new batch jobs are split into, a number of levels of the batch subjobs, a number of knowledge entities identified by each of the new batch jobs, a volume of the data amount identified by each of the new batch jobs, and combinations thereof;

the plurality of predictive models are grouped into clusters of predictive models making similar predictions; and the selected predictive model is selected based on which cluster is closest to the organization state.

59. A method of organizing a transmission of repository data, the method comprising:
receiving, in a computer system, a request to transmit data from a data repository to a data recipient, the data being transmitted in a plurality of concurrently executing batch jobs;
determining a size of the data to be transmitted, the size to be used in determining a number of batch jobs to be created for transmitting the data;
creating the number of batch jobs based on the size and initiating the batch jobs, wherein control parameters assigned to each of the batch jobs identify a data amount that is to be transmitted to the data recipient, wherein the control parameters are assigned to the batch jobs using one of a plurality of predictive models that is selected according to an organization state of the batch jobs;
monitoring a performance parameter of the computer system while performing the batch jobs to determine whether the performance parameter does not meet a predefined standard;
upon detecting during transmission that the performance parameter does not meet the predefined standard, evaluating whether a system resource tolerates creation of an additional batch job; and
modifying the control parameter for the additional batch job to allow creation of the additional batch job if the system resource tolerates the creation, and modify the control parameter for the additional batch job to allow merging of at least two of the batch jobs if the system resource does not tolerate the creation;
wherein:
the organization state is determined by collecting information selected from a group comprising: a number of batch subjobs that the new batch jobs are split into, a number of levels of the batch subjobs, a number of knowledge entities identified by each of the new batch jobs, a volume of the data amount identified by each of the new batch jobs, and combinations thereof;

the plurality of predictive models are grouped into clusters of predictive models making similar predictions; and the selected predictive model is selected based on which cluster is closest to the organization state.

60. The method of claim 59, wherein the batch jobs include a first batch job split into batch subjobs, wherein the first batch job identifies a first data amount and each of the subjobs identifies a portion of the first data amount.

61. The method of claim 60, wherein the additional batch job is an additional batch subjob and wherein the at least two of the batch jobs to be merged are at least two batch subjobs.

62. A computer program product tangibly embodied in a storage medium for storing the computer program product, the computer program product including instructions that, when executed, cause a processor to perform operations comprising:
receive, in a computer system, a request to transmit data from a data repository to a data recipient, the data being transmitted in a plurality of concurrently executing batch jobs;
retrieve a size of the data to be transmitted, the size to be used in determining a number of batch jobs to be created for transmitting the data;
create the number of batch jobs based on the size and initiating the batch jobs, wherein control parameters assigned to each of the batch jobs identify a data amount that is to be transmitted to the data recipient;
monitor a performance parameter of the computer system while performing the batch jobs to determine whether the performance parameter does not meet a predefined standard;
upon detecting during transmission that the performance parameter does not meet the predefined standard, evaluate whether a system resource tolerates creation of an additional batch job by determining availability of connections to the data repository; and
modify the control parameter for the additional batch job to allow creation of the additional batch job if the system resource tolerates the creation, and modify the control parameter of the additional batch job to allow merging of at least two of the batch jobs if the system resource does not tolerate the creation;
wherein:
the control parameters are assigned to the batch jobs using one of a plurality of predictive models that is selected according to an organization state, the organization state being determined by collecting information selected from a group comprising: a number of batch subjobs that the new batch jobs are split into, a number of levels of the batch subjobs, a number of knowledge entities identified by each of the new batch jobs, a volume of the data amount identified by each of the new batch jobs, and combinations thereof;

the plurality of predictive models are grouped into clusters of predictive models making similar predictions; and the selected predictive model is selected based on which cluster is closest to the organization state.

* * * * *